US006724482B2

(12) United States Patent
Wu

(10) Patent No.: US 6,724,482 B2
(45) Date of Patent: Apr. 20, 2004

(54) SYNTHESIS OF OPTICAL DISPERSION COMPENSATORS AND METHODS USING A SERIES OF GT CAVITIES

(75) Inventor: Shudong Wu, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/260,013

(22) Filed: Mar. 20, 2003

(65) Prior Publication Data

US 2003/0210401 A1 Nov. 13, 2003

Related U.S. Application Data

(63) Continuation of application No. 09/750,933, filed on Dec. 29, 2000, which is a continuation of application No. 09/718,644, filed on Nov. 22, 2000, now Pat. No. 6,487,342.

(51) Int. Cl.[7] .................................................. G01B 9/02
(52) U.S. Cl. ...................................... 356/450; 359/519
(58) Field of Search ................................ 356/450, 454, 356/519

(56) References Cited

U.S. PATENT DOCUMENTS

| | | | |
|---|---|---|---|
| 3,675,154 A | * | 7/1972 | Duguay et al. ................ 372/33 |
| 5,557,468 A | | 9/1996 | Ip ............................... 359/615 |
| 6,081,379 A | * | 6/2000 | Austin et al. ................. 359/584 |
| 6,356,684 B1 | | 3/2002 | Patterson et al. |
| 6,487,342 B1 | | 11/2002 | Wu et al. ...................... 385/39 |
| 6,519,065 B1 | | 2/2003 | Colbourne et al. .......... 359/161 |

FOREIGN PATENT DOCUMENTS

| | | |
|---|---|---|
| EP | 1/098212 | 5/2001 |
| EP | 1/098277 | 5/2001 |
| WO | WO 00/25154 | 4/2000 |

OTHER PUBLICATIONS

L.J. Cimini, Jr., et al., "Optical Equalization for High-Bit-Rate Fiber-Optic Communications," IEEE, 1990, pp. 200–202.

L.J. Cimini, Jr., et al., "Optical Equalization to Combat The Effects of Laser Chirp and Fiber Dispersion," Journal of Lightwave Technology, May 1990, vol. 8, No. 5, IEEE, pp. 649–659.

Charles A. Eldering et al., "Etalon Time Response Limitations As Calculated From Frequency Analysis," Optical Engineering, Mar. 1993, vol. 32, No. 3, pp. 464–468.

A.H. Gnauck et al., "Optical Equalization of Fiber Chromatic Dispersion in a 5–Gb/s Transmission System," IEEE Photonics Technology Letters, vol. 2, No. 8, Aug. 1990, pp. 585–587.

J.M. Jacobson et al., "Femtosecond Pulse Generation in a $Ti:Al_2O_3$ Laser by Using Second–And Third–Order Intracavity Dispersion," Optical Letters, vol. 17, No. 22, Nov. 1992, pp. 1608–1610.

Jurgen Kuhl et al., "Compression of Femtosecond Optical Pulses With Dielectric Multilayer Interfer-ometers," IEEE Transactions on Quantum Electronics, vol. QE–22, No. 1, Jan. 1986, pp. 182–185.

Kathryn D. Li et al., Broadband Cubic–Phase Compensation With Resonant Gires–Tournois Interferometers, Optics Letters, vol. 14, No. 9, May 1989, pp. 450–452.

(List continued on next page.)

*Primary Examiner*—Frank G. Font
*Assistant Examiner*—Michael A. Lyons
(74) *Attorney, Agent, or Firm*—Wilson Sonsini Goodrich & Rosati

(57) ABSTRACT

The invention provides a dispersion compensation system and method formed by cascading a series of GT cavities with three setting parameters, reflectivity, resonant wavelength, and free-spectral-range. In one aspect of the invention, the GT cavities can synthesize any shape of combined dispersion compensation, including positive, negative, slope dispersion compensation. In another aspect of the invention, the GT cavities are tunable or dynamic to accommodate various types of dispersion compensation. Advantageously, the present invention provides an effective cost solution for a more precise dispersion compensation tuning.

13 Claims, 9 Drawing Sheets

OTHER PUBLICATIONS

W. Zhao, "Compression of Nonlinearly Chirped Pulses Using Gires–Tournois Interferometers," *American Institute of Physics*, vol. 50, No. 19, May 1987, pp. 1304–1306.

Madsen, C.K. et al., "A Multi–Channel Dispersion Slope Compensating Optical Allpass Filter," *Optical Fiber Communication Conference*, 2000, vol. 2, pp. 94–96.

* cited by examiner

US 6,724,482 B2

SYNTHESIS OF OPTICAL DISPERSION COMPENSATORS AND METHODS USING A SERIES OF GT CAVITIES

CROSS-REFERENCE TO RELATED APPLICATIONS

This application is a continuation of U.S. patent application Ser. No. 09/750,933, filed Dec. 29, 2000, entitled "Synthesis of Optical Dispersion Compensators and Methods Using A Series of GT Cavities," which is a continuation of U.S. patent application Ser. No. 09/718,644, filed on Nov. 22, 2000, now U.S. Pat. No. 6,487,342, entitled "Method, System and Apparatus for Chromatic Dispersion Compensation Utilizing a Gires-Tournoise Interferometer," all of which are assigned to the assignee of this application and incorporated herein by reference.

BACKGROUND INFORMATION

1. Field of the Invention

The present invention relates to the field of fiber optic networks, and more particularly to chromatic dispersion compensators in optical and photonic networks which carry wavelength division multiplexed signals.

2. Description of Related Art

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal having light of a specific restricted wavelength range, may be transmitted along the same optical fiber.

Each individual information-carrying light is referred to as either "signal" or "channel". The totality of multiple combined signals in a wavelength-division multiplexed optical fiber, optical line, or optical system, where each signal is of a different wavelength range, is referred to as a "composite optical signal".

The term "wavelength", denoted by the Greek letter $\lambda$ (lambda) is used synonymously with the terms "signal" or "channel". Although each information-carrying channel may include light of a certain range of physical wavelengths, for simplicity, a single channel is referred to as a single wavelength, $\lambda$, and a plurality of n such channels are referred to as "n wavelengths" denoted as $\lambda_1, \lambda_2, \ldots \lambda_n$. Used in this sense, the term "wavelength" may be understood to refer to "the channel nominally comprised of light of a range of physical wavelength centered at the particular wavelength $\lambda$".

Chromatic dispersion is a common well-know problems in high-speed transmission of optical signals. Chromatic dispersion refers to the effect where the various physical wavelengths having an individual channel either travel through an optical fiber or component at different speeds— for instance, longer wavelengths travel faster than shorter wavelengths, or vice versa—or else travel different length paths through a component. This particular problem becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of a signal. Therefore, for fiber optic communication system that provides a high transmission capacity, the system must be equipped to compensate for chromatic dispersion.

Conventional techniques in dealing with chromatic dispersion compensation have been proposed or implemented, such as spectral shaping, interferometers, negative dispersion fiber, and spectral inversion. The objective is to make longer wavelengths travel faster, or make shorter wavelengths travel slower, so that a composite optical signal arrives to a receiver location at the same time. It is also known that Gires-Tournois interferometers (GT cavity) can be used for dispersion compensation. However, a significant shortcoming in GT cavity is that the compensation bandwidth is too narrow for real applications.

Accordingly, there is a need to have a system and method for synthesis of dispersion compensation utilizing GT cavities, which synthesizes any desired compensation functions and provides dispersion compensators on demand.

SUMMARY OF THE INVENTION

The invention provides dispersion compensation systems and methods formed by cascading a series of GT cavities for compensating different chromatic dispersion. In one aspect of the invention, the GT cavities can synthesize any shape of combined dispersion compensation, including positive, negative, and slope dispersion compensation. In another aspect of the invention, the GT cavities are tunable or dynamic to accommodate various types of dispersion compensation. Advantageously, the present invention provides an effective cost solution for easy dispersion compensation tuning.

Other structures and methods are disclosed in the detailed description below. This summary does not purport to define the invention. The invention is defined by the claims.

DETAILED DESCRIPTION OF PREFERRED EMBODIMENTS

Figure 1:
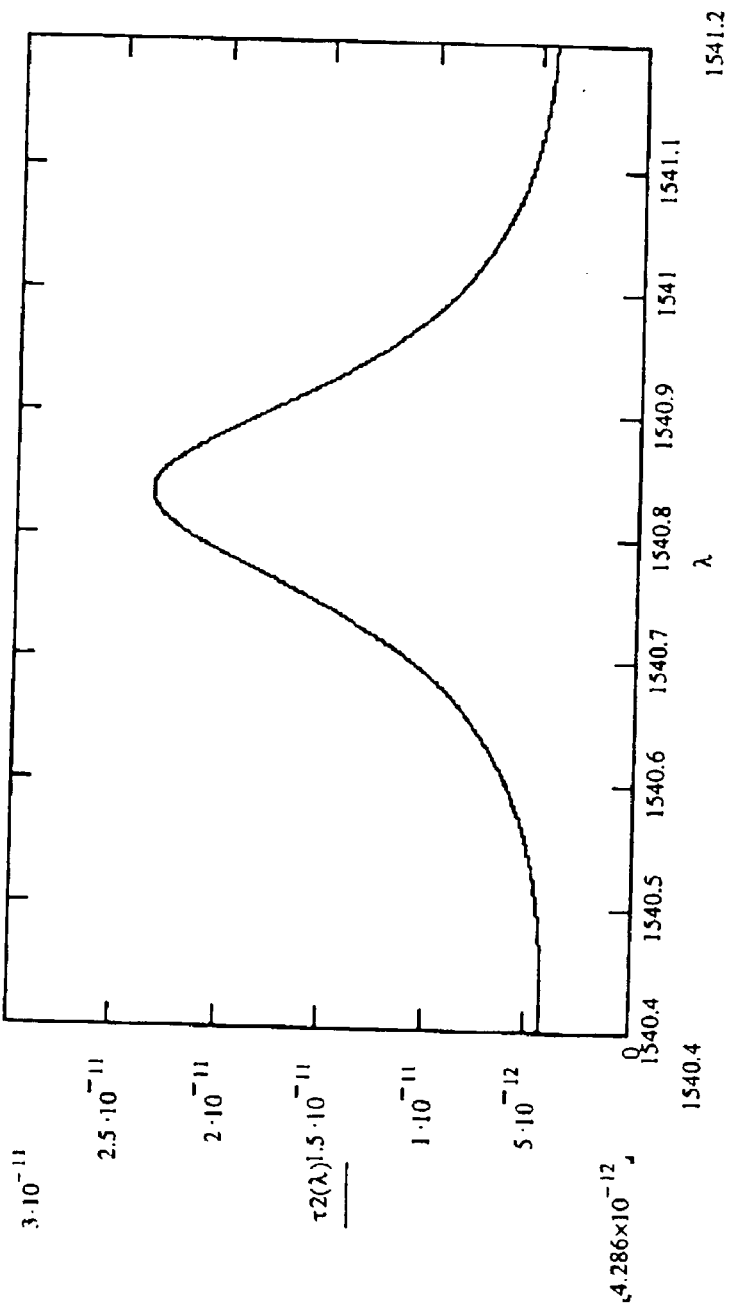
FIG. 1 is a graphical diagram illustrating a dispersion compensator of a group delay function in a single GT cavity in accordance with the present invention.

FIG. 1 is a graphical diagram illustrating a dispersion compensator of a group delay function 10 in a single GT cavity. The group delay is represented as a function of wavelength GD(R, λ), where GD stands for group delay and R denotes as the reflectivity of the cavity front mirror. The higher the value of R, the higher the peak group delay and the narrower the group delay function. It is analogous to a Dirac function within a limited region. Any desired group delay function can be synthesized by a summation of a set of group delay functions with various $R_i$ and wavelength shift, $\Delta\lambda_i$, as shown in equation 1 below:

$$F(\lambda) = \sum_{i=1}^{N} GD(Ri, \Delta\lambda i)_i \qquad \text{Eq. (1)}$$

where N represents the number of cavities.

Alternatively, a group delay function can be characterized by equation 2 as shown below:

$$g(x) = \int \sum \delta_i(x_i - x') g_i(x') dx' \qquad \text{Eq. (2)}$$

where the term $\delta(x-x')$ represents the position function, and $g(x')$ represents the weighing function. The term $\delta(x_i-x')$ is adjusted by cavity thickness, and the term $g_i(x')$ is adjusted by a reflectivity parameter, R.

Figure 2:
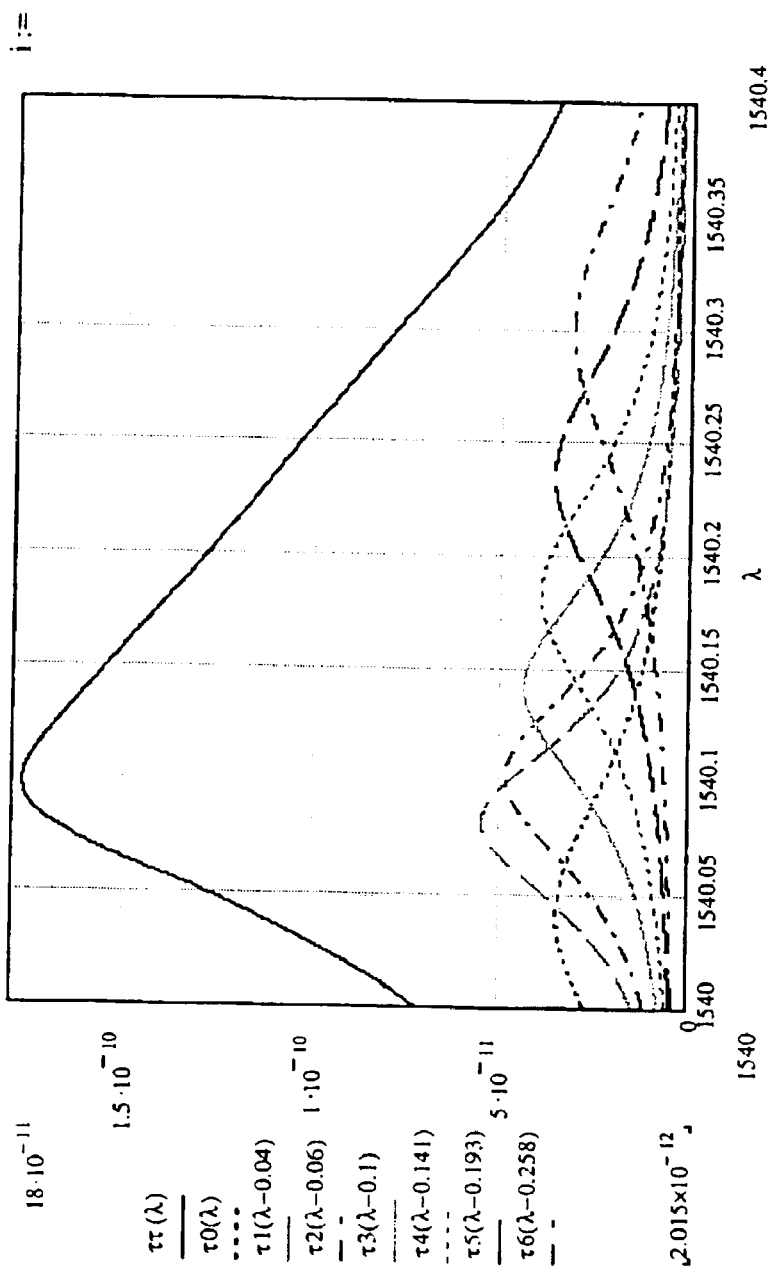
FIG. 2 is a graphical diagram illustrating a group delay function of a synthesized constant dispersion compensator in accordance with the present invention.
Figure 3:
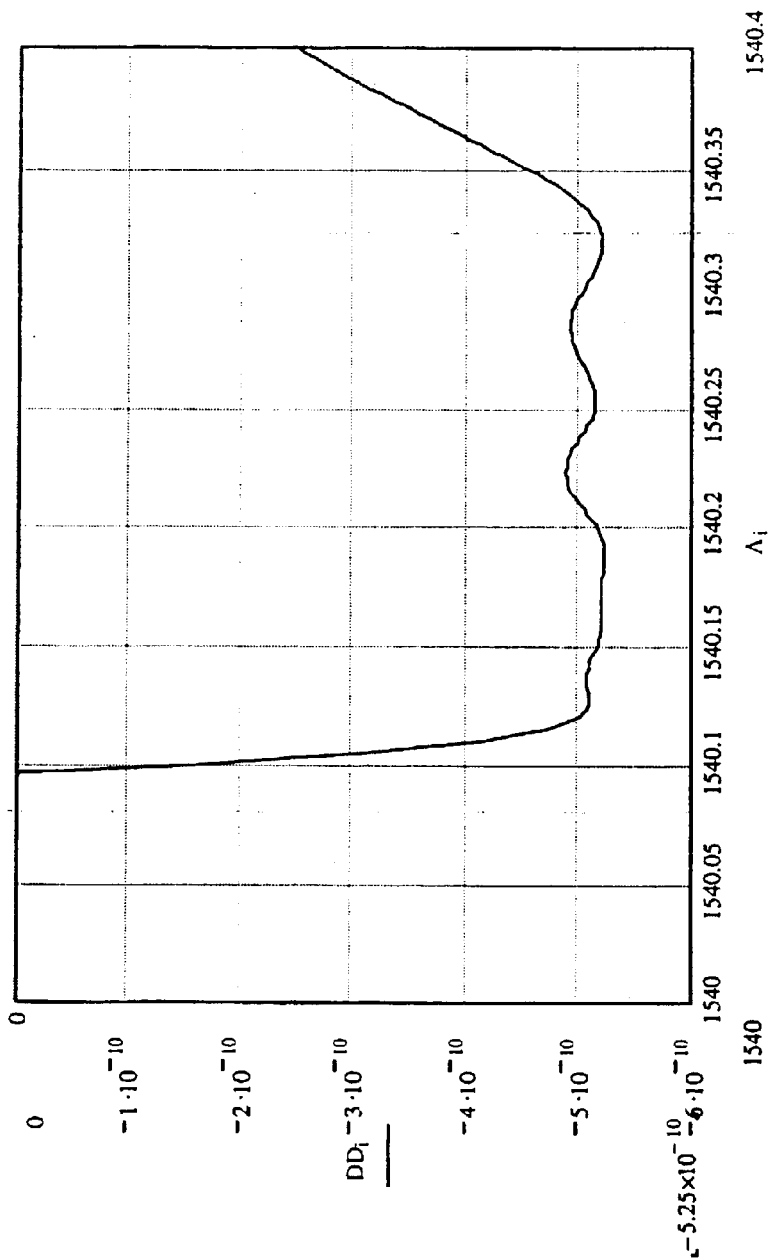
FIG. 3 is a graphical diagram illustrating the dispersion function of the synthesized compensator as shown in FIG. 2.

FIG. 2 is a graphical diagram illustrating a group delay function 20 of a synthesized constant dispersion compensator. The group delay function is the summation of the group delay functions of 7 GT cavities with various reflectivity and resonant wavelengths. The combined group delay function has a constant negative slope, which gives a constant negative dispersion. FIG. 3 is the derivative of FIG. 2, that is the synthesized dispersion function. Because the spectrum of GT cavities is a periodical function of wavelength, each channel will have the same dispersion function as long as the free-spectral-range of each cavity matches the International Telecommunications Union (ITU) grid. Another example of synthesis of dispersion compensation is dispersion slope compensation. That is, the desired dispersion function is a linear function of channel central wavelength. This dispersion slope compensation function can be synthesized by means of controlling three parameters of the GT cavities, that is reflectivity, resonant wavelength, and free-spectral-range.

Figure 4:
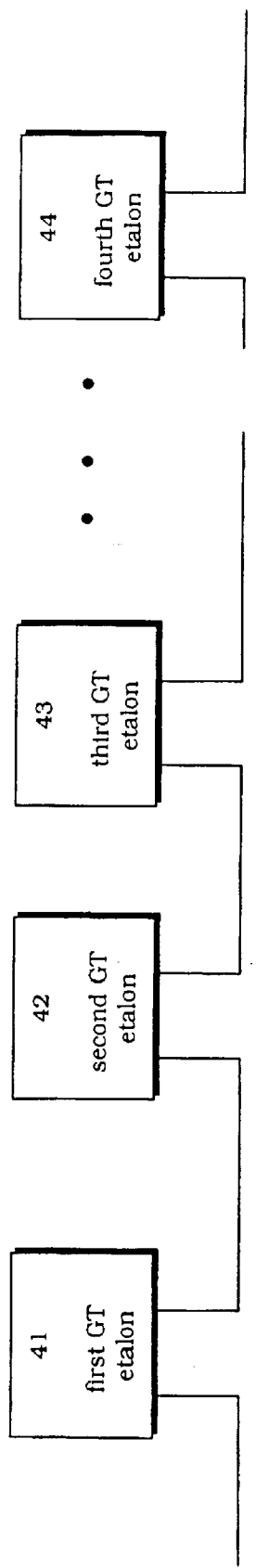
FIG. 4 is a general architectural diagram illustrating a first embodiment of a dispersion compensation synthesis using GT cavities in accordance—with the present invention.

FIG. 4 is a general architectural diagram 40 illustrating a first embodiment of a dispersion compensation synthesis using GT cavities 41, 42, 43, and 44. Each of the GT cavities 41, 42, 43, and 44 has a different granularity of dispersion compensation. By setting three parameters of each GT cavity, that is, reflectivity, resonant wavelength, and free-spectral-range, any desired chromatic dispersion compensation function can be synthesized.

Figure 5:
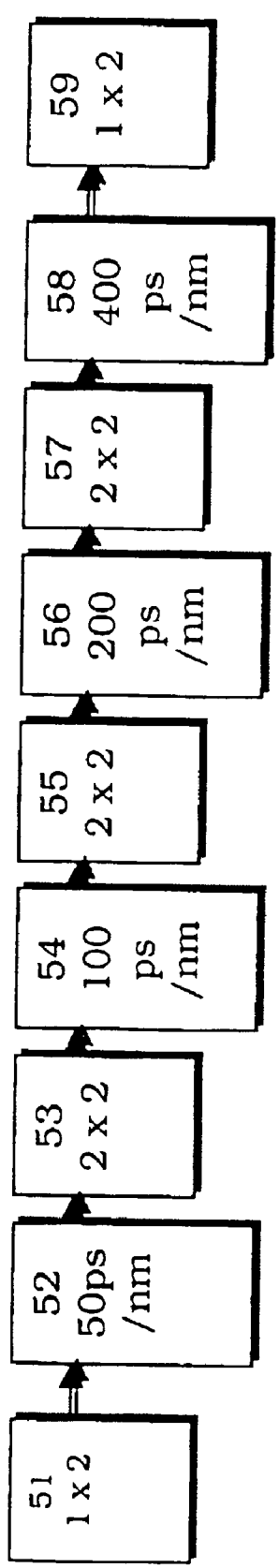
FIG. 5 is an architectural diagram illustrating a tunable compensator formed by compensators and optical switches as shown in the first embodiment in accordance with the present invention.

FIG. 5 is an architectural diagram illustrating a tunable compensator 50 formed by compensators and optical switches as shown in the first embodiment. In principle, any fixed dispersion compensators can be synthesized by the description given with respect to FIG. 1. In this implementation, a combination of fixed compensators and optical switches are selected to construct the tunable dispersion compensator 50, which includes N fixed compensators 52, 54, 56, and 58, N−1 2×2 switches 53, 55, and 57, and two 1×2 switches 51 and 59. The compensators compensates at different dispersion rate, with the compensator 52 set at 50 ps/nm, the compensator 54 set at 100 ps/nm, the compensator 56 set at 200 ps/nm, and the compensator 58 set at 400 ps/nm. Depending on the precision of dispersion compensation required, a compensator among the fixed compensators 52, 54, 56, and 58 with smallest dispersion produces the resolution of the tunable compensator 50.

Figure 6:
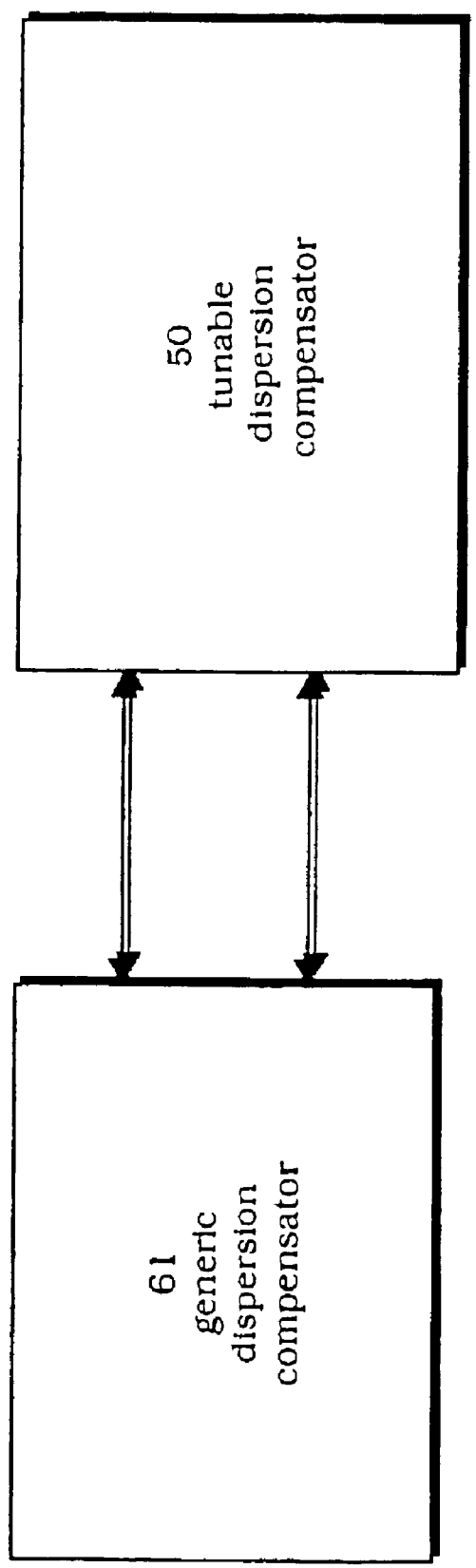
FIG. 6 is an architectural diagram illustrating a second embodiment of a dispersion compensation synthesis using a series of GT cavities in accordance with the present invention.

FIG. 6 is an architectural diagram illustrating a second embodiment of a dispersion compensation synthesis using a series of GT cavities. The tunable dispersion compensator 50 can be coupled to a generic dispersion compensator 60 for precision tuning for dispersion compensation. The tunable dispersion compensator 50 operates according to the description provided above with respect to FIG. 5, such that an appropriate dispersion compensation rate is utilized in conjunction with a generic dispersion compensator 60.

Figure 7:
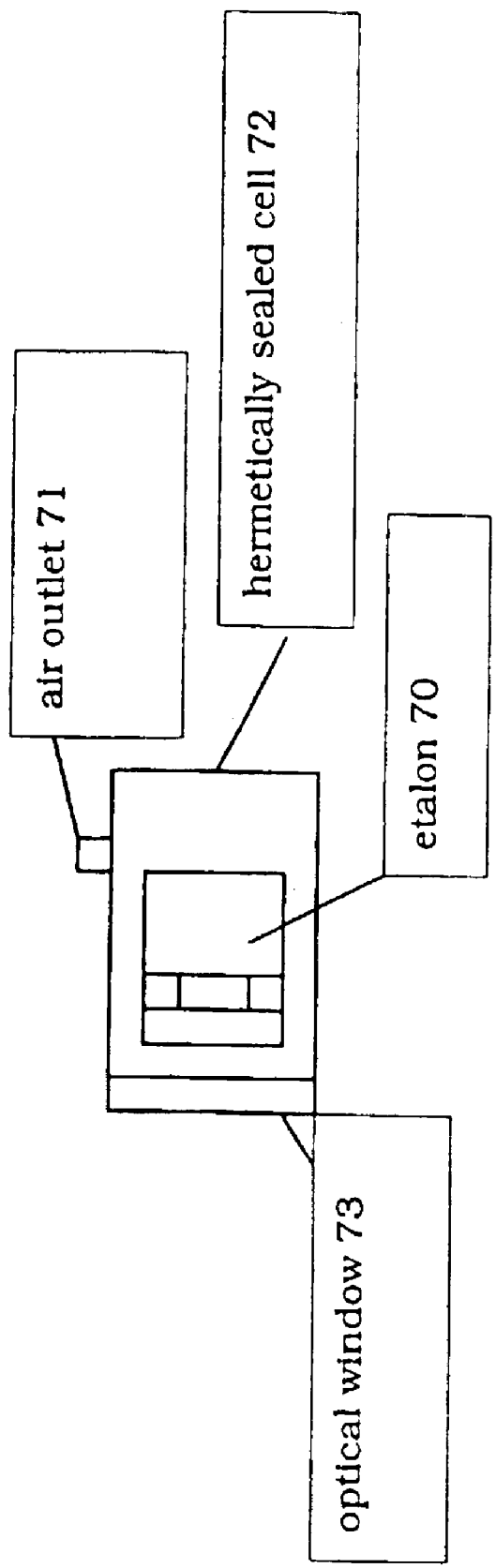
FIG. 7 is a block diagram illustrating an cavity wavelength tuning by air pressure control in accordance with the present invention.

FIG. 7 is a block diagram illustrating a cavity 70 with wavelength tuning by air pressure control. By controlling the air pressure inside the cavity 70 through an air outlet 71, the resonant wavelength of the cavity can be precisely set. This can be done by putting the cavity 70 into a hermetic sealed cell 72, whose air pressure can be precisely controlled. The cell has an optical window 73 so that the cavity 70 can be accessed optically from outside the hermetically sealed cell 72. In one embodiment, one atmosphere pressure change gives about 0.45 nm wavelength tuning at wavelength 1550 nm.

Figure 8:
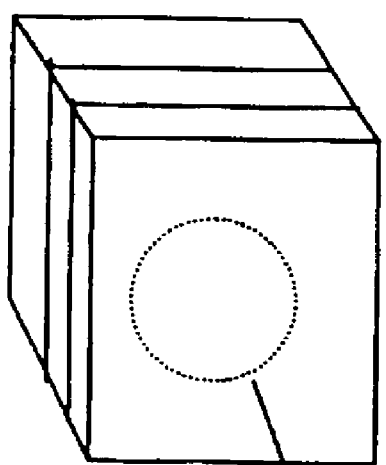
FIG. 8 is a block diagram illustrating a sealed cavity in accordance with the present invention.

FIG. 8 is a block diagram illustrating a sealed cavity 80 with wavelength tuning of the sealed cavity 80 by laser-evaporating materials inside the cavity 80. To control the air pressure, some material is put inside the cavity before the cavity is sealed. By shining a laser beam on the material through an cavity window 81, the material is evaporated and changes the air pressure inside the cavity 80. The sealed cavity 80 is preferably completely or substantially sealed.

Figure 9:
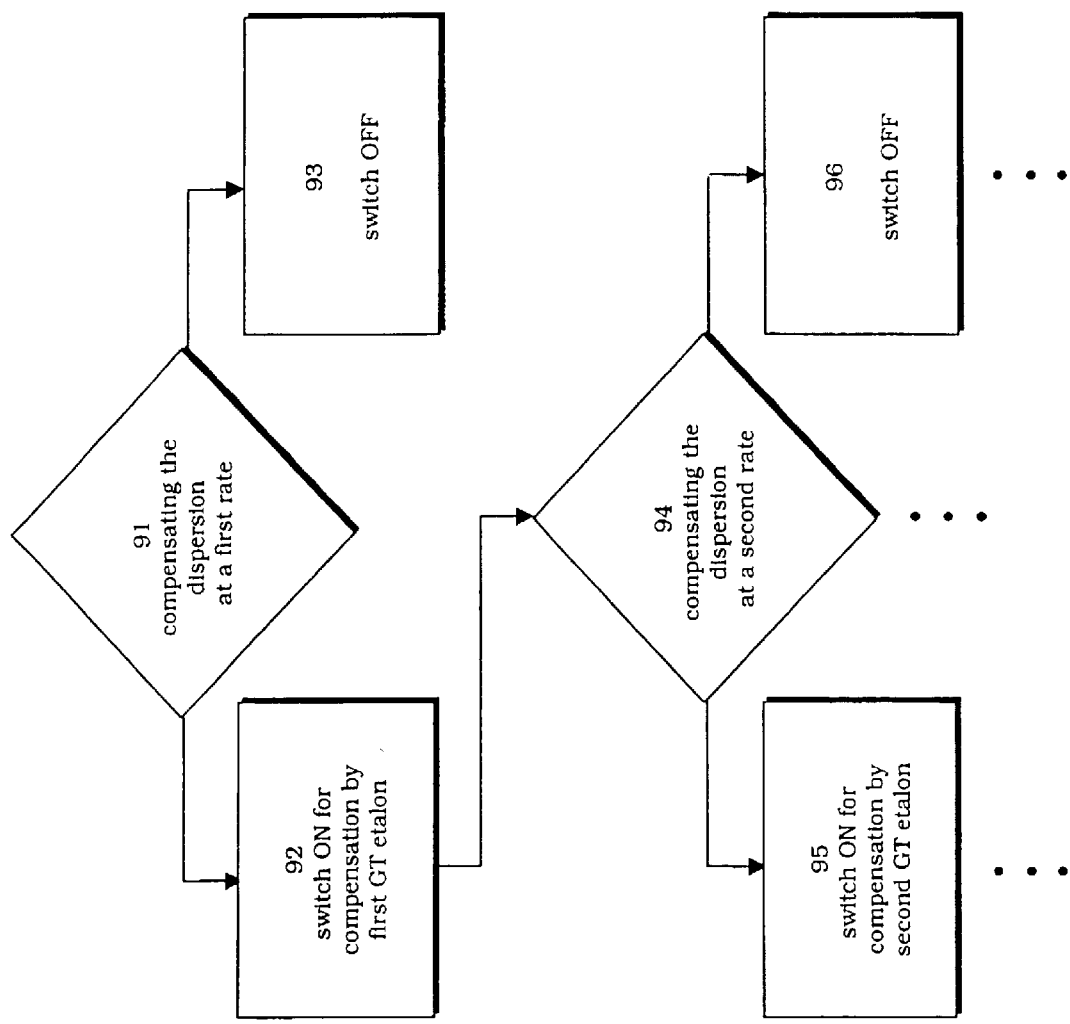
FIG. 9 is a flow chart illustrating the process of performing a dispersion compensation synthesis using GT cavities in accordance with the present invention.

FIG. 9 is a flow chart illustrating the process 90 for performing a dispersion compensation synthesis using GT cavities. At the initial stage, the process 90 determines 91 whether to compensate the dispersion of an optical signal at a first rate. The switch 51 is turned ON 92 if the process 90 decides to activate the first GT cavity 41 for dispersion compensation. Otherwise, the switch 51 is turned OFF 93. Continuing to the next stage with a finer precision of dispersion tuning, the process 90 determines 94 whether to compensation the dispersion of the optical signal at a second rate. The switch 53 is turned ON 95 if the process 90 decides to activate the second GT cavity 42 for dispersion compensation. Otherwise, the switch 53 is turned OFF 96. Additional stages of GT cavities can be constructed to achieve greater precision of dispersion compensation in an optical signal.

The above embodiments are only illustrative of the principles of this invention and are not intended to limit the invention to the particular embodiments described. For example, although FIG. 5 shows dispersion compensation at 50 ps/nm, 100 ps/nm, 200 ps/nm, and 400 ps/nm, one of ordinary skill in the art should recognize that different increments of dispersion compensation can be selected without departing from the spirits in the present invention. Accordingly, various modifications, adaptations, and combinations of various features of the described embodiments can be practiced without departing from the scope of the invention as set forth in the appended claims.

What is claimed is:

1. A dispersion compensation synthesizer, comprising:
   a first GT cavity for dispersion compensation at a first rate;
   a second GT cavity for dispersion compensation at a second rate, coupled to the first GT cavity, the combination of the first and second GT cavities compensating for different chromatic dispersion, the second rate of the second GT cavity providing a finer dispersion compensation than the first rate of the first GT cavity.

2. The dispersion compensation synthesizer of claim 1, further comprising a third GT cavity, coupled to the second GT cavity, the third GT cavity providing a finer dispersion compensation than the second GT cavity.

3. The dispersion compensation synthesizer of claim 1, further comprising a generic dispersion compensator, coupled to the first GT cavity.

4. The dispersion compensation synthesizer of claim 1, wherein a wavelength in the first GT cavity is set by air pressure.

5. The dispersion compensation synthesizer of claim 1, wherein a wavelength in the first GT cavity is set by evaporating the material in the first GT cavity and a sealed cavity in the first GT cavity by laser or RF heating.

6. The dispersion compensation synthesizer of claim 1, wherein a wavelength in the second GT cavity is set by air pressure.

7. The dispersion compensation synthesizer of claim 1, wherein a wavelength in the second GT cavity is set by evaporating the material in the second GT cavity and a sealed cavity in the second GT cavity by laser or RF heating.

8. A method for dispersion compensation synthesis, comprising:
  providing a first dispersion compensation function, the first dispersion compensation function comprising parameters of a first reflectivity, a first resonance wavelength, and a first free-spectral-range; and
  providing a second dispersion compensation function, the second dispersion compensation function comprising parameters of a second reflectivity, a second resonance wavelength, and a second free-spectral-range, the first and second dispersion compensation functions forming a tunable dispersion compensation for an optical signal.

9. The method of claim 8, wherein the combination of the first and second dispersion compensation functions forms a constant dispersion compensation for all channels.

10. The method of claim 8, wherein the combination of the first and second dispersion compensation functions form a slope dispersion compensation for all channels, the slope dispersion compensation representing a linear relationship between a central channel and other channels.

11. The method of claim 8, wherein the composite dispersion compensation slope comprise a positive slope.

12. The method of claim 8, wherein the composite dispersion compensation slope comprises a negative slope.

13. A method for dispersion compensator synthesis, comprising:
  approximating at least two GT cavities to realize a requisite dispersion compensation, each GT cavity including a mirror reflectivity parameter and a wavelength setting parameter for use to compute the desirable number of cavities.
  extracting a mirror reflectivity parameter from each GT cavity; and
  extracting a wavelength setting parameter from each GT cavity, wherein the combination of the mirror reflectivity parameter and the wavelength setting are computed for operation with a particular dispersion compensation function.

* * * * *